(12) United States Patent
Golliver et al.

(10) Patent No.: US 6,272,512 B1
(45) Date of Patent: Aug. 7, 2001

(54) DATA MANIPULATION INSTRUCTION FOR ENHANCING VALUE AND EFFICIENCY OF COMPLEX ARITHMETIC

(75) Inventors: Roger A. Golliver, Beaverton, OR (US); Carole Dulong, Saratoga, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/170,473

(22) Filed: Oct. 12, 1998

(51) Int. Cl.$^7$ .................................................. G06F 7/52
(52) U.S. Cl. ................................... 708/622; 712/221
(58) Field of Search .................................. 708/622, 511, 708/501, 523; 712/221, 222

(56) References Cited

U.S. PATENT DOCUMENTS

| | | | |
|---|---|---|---|
| 5,473,557 | * 12/1995 | Harrison et al. | 708/511 |
| 5,859,997 | * 1/1999 | Peleg et al. | 712/221 |
| 5,936,872 | * 8/1999 | Fischer et al. | 708/622 |
| 5,953,241 | * 9/1999 | Hansen et al. | 708/523 |

* cited by examiner

Primary Examiner—David H. Malzahn
(74) Attorney, Agent, or Firm—Blakely, Sokoloff, Taylor & Zafman LLP (57) ABSTRACT

A method and apparatus for performing complex arithmetic is disclosed. In one embodiment, a method comprises decoding a single instruction, and in response to decoding the single instruction, moving a first operand occupying lower order bits of a first storage area to higher order bits of a result, moving a second operand occupying higher order bits of a second storage area to lower order bits of the result, and negating one of the first and second operands of the result.

20 Claims, 5 Drawing Sheets

DATA MANIPULATION INSTRUCTION FOR ENHANCING VALUE AND EFFICIENCY OF COMPLEX ARITHMETIC

BACKGROUND OF THE INVENTION

1. Field of the Invention

The present invention relates generally to the field of computer systems, and specifically, to a data manipulation instruction for enhancing value and efficiency of performing complex arithmetic instructions.

2. Background Information

To improve the efficiency of multimedia applications, as well as other applications with similar characteristics, a Single Instruction, Multiple Data (SIMD) architecture has been implemented in computer systems to enable one instruction to operate on several operands simultaneously, rather than on a single operand. In particular, SIMD architectures take advantage of packing many data elements within one register or memory location. With parallel hardware execution, multiple operations can be performed on separate data elements with one instruction, resulting in a significant performance improvement. The SIMD architecture applies to both integer and floating-point operands.

The SIMD data format of packing data elements within a register or memory location is a natural format for representing complex data. That is, first and second data elements of an operand may comprise real and imaginary components of the complex number, respectively. Many applications require the multiplication of complex numbers such as, for example, signal processing applications. To increase the efficiency of these applications, it is therefore desirable to reduce the number of instructions required for performing a complex multiply.

SUMMARY OF THE INVENTION

The present invention comprises a method and apparatus for performing complex arithmetic. In one embodiment, a method comprises decoding a single instruction, and in response to decoding the single instruction, moving a first operand occupying lower order bits of a first storage area to higher order bits of a result, moving a second operand occupying higher order bits of a second storage area to lower order bits of the result, and negating one of the first and second operands of the result.

DETAILED DESCRIPTION

Figure 1:
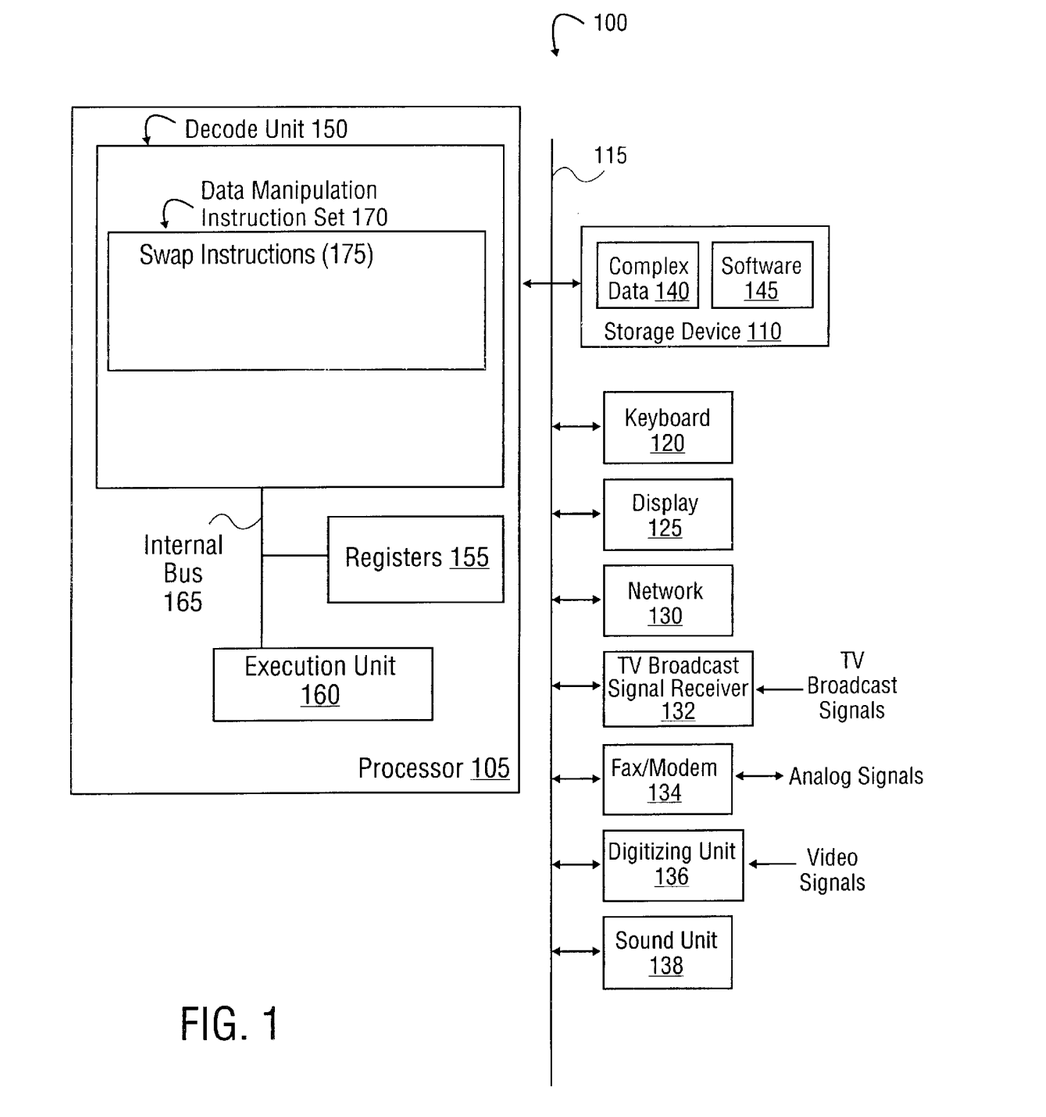
FIG. 1 is a block diagram illustrating an exemplary computer system according to one embodiment of the invention.

FIG. 1 is a block diagram illustrating an exemplary computer system 100 according to one embodiment of the invention. The exemplary computer system 100 includes a processor 105, a storage device 110, and a bus 115. The processor 105 is coupled to the storage device 110 by the bus 115. In addition, a number of user input/output devices, such as a keyboard 120 and a display 125 are also coupled to the bus 115. The processor 105 represents a central processing unit of any type of architecture, such as a CISC, RISC, VLIW, or hybrid architecture. In addition, the processor 105 could be implemented on one or more chips. The storage device 110 represents one or more mechanisms for storing data. For example, the storage device 110 may include read only memory ("ROM"), random access memory ("RAM"), magnetic disk storage mediums, optical storage mediums, flash memory devices, and/or other machine-readable mediums. The bus 115 represents one or more busses (e.g., PCI, ISA, X-Bus, EISA, VESA, etc.) and bridges (also termed as bus controllers). While this embodiment is described in relation to a single processor computer system, the invention could be implemented in a multi-processor computer system. In addition, while this embodiment is described in relation to a 64-bit computer system, the invention is not limited to a 64-bit computer system.

In addition to other devices, one or more of a network 130, a TV broadcast signal receiver 132, a fax/modem 134, a digitizing unit 136, and a sound unit 138 may optionally be coupled to bus 115. The network 130 represents one or more network connections (e.g., an Ethernet connection), the TV broadcast signal receiver 132 represents a device for receiving TV broadcast signals, and the fax/modem 134 represents a fax and/or modem for receiving and/or transmitting analog signals representing data. The digitizing unit 136 represents one or more devices for digitizing images (e.g., a scanner, camera, etc.). The sound unit 138 represents one or more devices for inputting and/or outputting sound (e.g., microphones, speakers, magnetic storage devices, optical storage devices, etc.). An analog-to-digital converter (not shown) may optionally be coupled to the bus 115 for converting complex values received externally into digital form. These complex values may be received as a result of, for example, a signal processing application (e.g., sonar, radar, seismology, speech communication, data communication, etc) running on the computer system 100.

FIG. 1 also illustrates that the storage device 110 has stored therein, among other data formats, complex data 140 and software 145. Software 145 represents the necessary code for performing any and/or all of the techniques described with reference to FIGS. 2 through 5. Of course, the storage device 110 preferably contains additional software (not shown), which is not necessary to understanding the invention.

FIG. 1 additionally illustrates that the processor 105 includes a decode unit 150, a set of registers 155, an execution unit 160, and an internal bus 165 for executing instructions. Of course, the processor 105 contains additional circuitry, which is not necessary to understanding the invention. The decode unit 150, registers 155, and execution unit 160 are coupled together by internal bus 165. The decode unit 150 is used for decoding instructions received by processor 105 into control signals and/or microcode entry points. In response to these control signals and/or microcode entry points, the execution unit 160 performs the appropriate operations. The decode unit 150 may be implemented using any number of different mechanisms (e.g., a look-up table, a hardware implementation, a PLA, etc.).

The decode unit 150 is shown including a data manipulation instruction set 170 for performing operations on packed data. In one embodiment, the data manipulation instruction set 170 includes floating-point swap instructions 175. The floating-point swap instructions include a floating-point swap ("FSWAP"), floating-point swap negate-left ("FSWAP-NL"), and floating-point swap negate-right ("FSWAP-NR") instructions, as will be further described herein. While the floating-point swap instructions 175 can be implemented to perform any number of different operations, in one embodiment they operate on packed data. Furthermore, in one embodiment, the processor 105 is a pipelined processor (e.g., the Pentium® II processor) capable of completing one or more of these data manipulation instructions per clock cycle (ignoring any data dependencies and pipeline freezes). In addition to the data manipulation instructions, processor 105 can include new instructions and/or instructions similar to or the same as those found in existing general-purpose processors. For example, in one embodiment the processor 105 supports an instruction set which is compatible with the Intel® Architecture instruction set used by existing processors, such as the Pentium® II processor. Alternative embodiments of the invention may contain more or less, as well as different, data manipulation instructions and still utilize the teachings of the invention.

The registers 155 represent a storage area on processor 105 for storing information, including control/status information, packed integer data, and packed floating point data. It is understood that one aspect of the invention is the described floating-point data manipulation instructions for operating on packed data. According to this aspect of the invention, the storage area used for storing the packed data is not critical. The term data processing system is used herein to refer to any machine for processing data, including the computer system(s) described with reference to FIG. 1. The term operand as used herein refers to the data on which an instruction operates.

Moreover, the floating-point instructions operate on packed data located in floating-point registers and/or memory. When floating-point values are stored in memory, they can be stored as single precision format (32 bits), double precision format (64 bits), double extended precision format (80 bits), etc. In one embodiment, a floating-point register is eighty-two (82) bits wide to store an unpacked floating-point value in extended precision format. However, in the case of a packed floating-point value having first and second data elements, each data element is stored in the floating-point register as single precision format (32 bits) to occupy bits 0–63 of the floating-point register. In such a case, the highest order bits (bits 64–81) of the floating-point register are ignored.

Figure 2A:
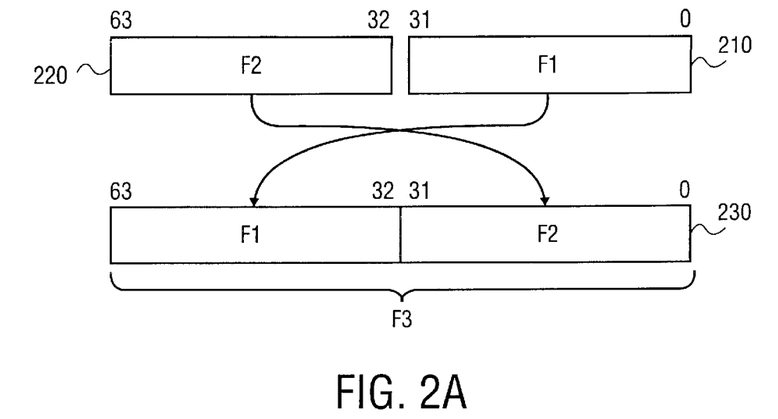
FIGS. 2A–2C illustrate floating-point swap instructions for performing complex arithmetic according to one embodiment of the present invention.
Figure 2B:
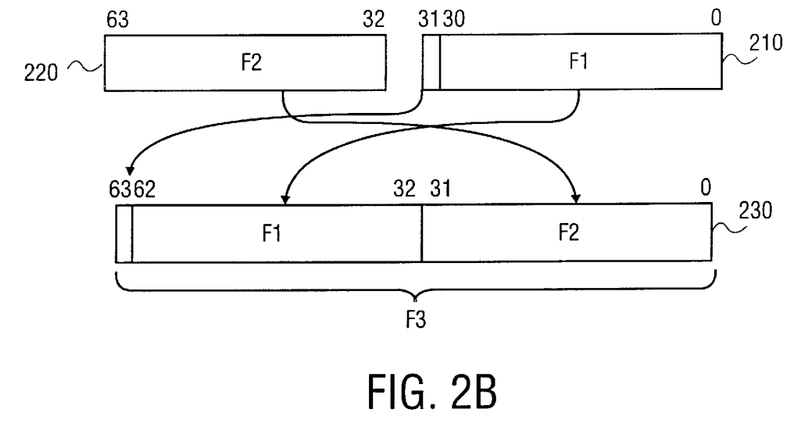
Figure 2C:
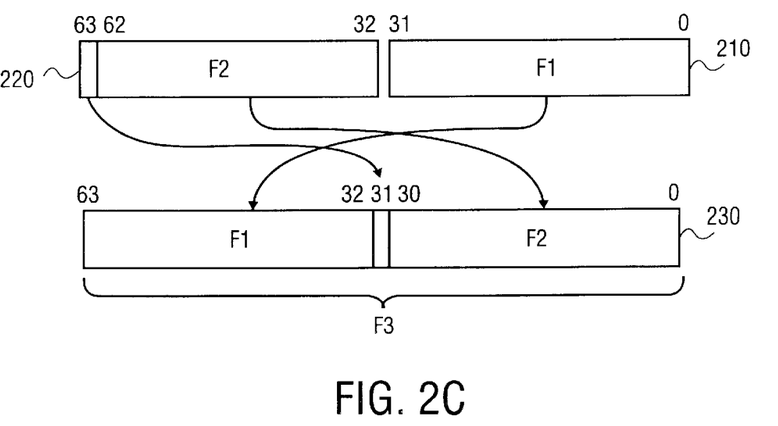

FIGS. 2A–2C illustrate floating-point swap instructions for performing complex arithmetic according to one embodiment of the present invention. Referring to FIG. 2A, a first operand F1 occupies the lower order bits (bits 0–31) of a first storage area 210 and a second operand F2 occupies the higher order bits (bits 32–63) of a second storage area 220. The FSWAP instruction causes the first operand F1 to be placed in the higher order bits (bits 32–63) of a third storage area 230, and the second operand F2 to be placed in the lower order bits (bits 0–31) of the third storage area 230. In essence, the FSWAP instruction concatenates the first operand F1 with the second operand F2 (in the case where storage areas 210 and 220 are different), and then swaps the concatenated pair.

Referring now to FIG. 2B, a first operand F1 occupies the lower order bits (bits 0–31) of a first storage area 210 and a second operand F2 occupies the higher order bits (bits 32–63) of a second storage area 220. The FSWAP-NL instruction causes the first operand F1 to be placed in the higher order bits (bits 32–63) of a third storage area 230 and the most significant bit of the first operand F1 is negated (bit 63). In addition, the second operand F2 is placed in the lower order bits (bits 0–31) of the third storage area 230. As can be seen, the FSWAP-NL instruction concatenates the first operand F1 with the second operand F2 in a third storage area (in the case where storage areas 210 and 220 are different), swaps the concatenated pair, and negates the first operand F1.

Turning now to FIG. 2C, a first operand F1 occupies the lower order bits (bits 0–31) of a first storage area 210 and a second operand F2 occupies the higher order bits (bits 32–63) of a second storage area 220. The FSWAP-NR instruction causes the first operand F1 to be placed in the higher order bits (bits 32–63) of a third storage area 230. In addition, the second operand F2 is placed in the lower order bits (bits 0–31) of the third storage area 230 and the most significant bit of the second operand is negated (bit 31). Thus, the FSWAP-NR instruction concatenates the first operand F1 with the second operand F2 in a third storage area 230 (in the case where storage areas 210 and 220 are different), swaps the concatenated pair, and negates the second operand F2.

Continuing to refer to FIGS. 2A–2C, the first, second, and third storage areas 210, 220, and 230 may comprise registers, memory locations, or a combination thereof. The first and second storage areas 210 and 220 may be the same storage area or may comprise different storage areas. The first and second operands F1 and F2 each represent a data element of a packed floating-point value. In the case where the storage areas 210 and 220 are the same storage area, a packed floating-point value comprises operands F1 (bits 0–31) and F2 (bits 32–63). On the other hand, in the case where the storage areas 210 and 220 are different storage areas, the higher order bits (bits 32–63) of the first storage area 210 and the lower order bits (bits 0–31) of the second storage area 220 are not shown because they are "don't care" values. The result F3 represents a packed floating-point value. If the storage area 230 is a floating-point register, then the highest order bits (bits 64–81) are ignored. Additionally, the third storage area 230 may be the same storage area as one of the storage areas 210 and 220. The floating-point swap instructions are especially useful in complex arithmetic, as will be illustrated below.

Microprocessors either follow the little endian or big endian byte ordering protocol. The little endian protocol states that the lowest address byte contains the least significant byte of a larger data value, while the highest address byte contains the most significant byte of the larger data value. The big endian protocol is the exact opposite. For complex numbers, the little endian protocol states that the low address byte contains the real component of a complex number whereas the high address byte contains the imaginary component of the complex number. Again, the big endian protocol states the opposite. The SWAP-NL and SWAP-NR instructions are both provided so that the instruction can be used with both the little and big endian protocols.

Figure 3A:
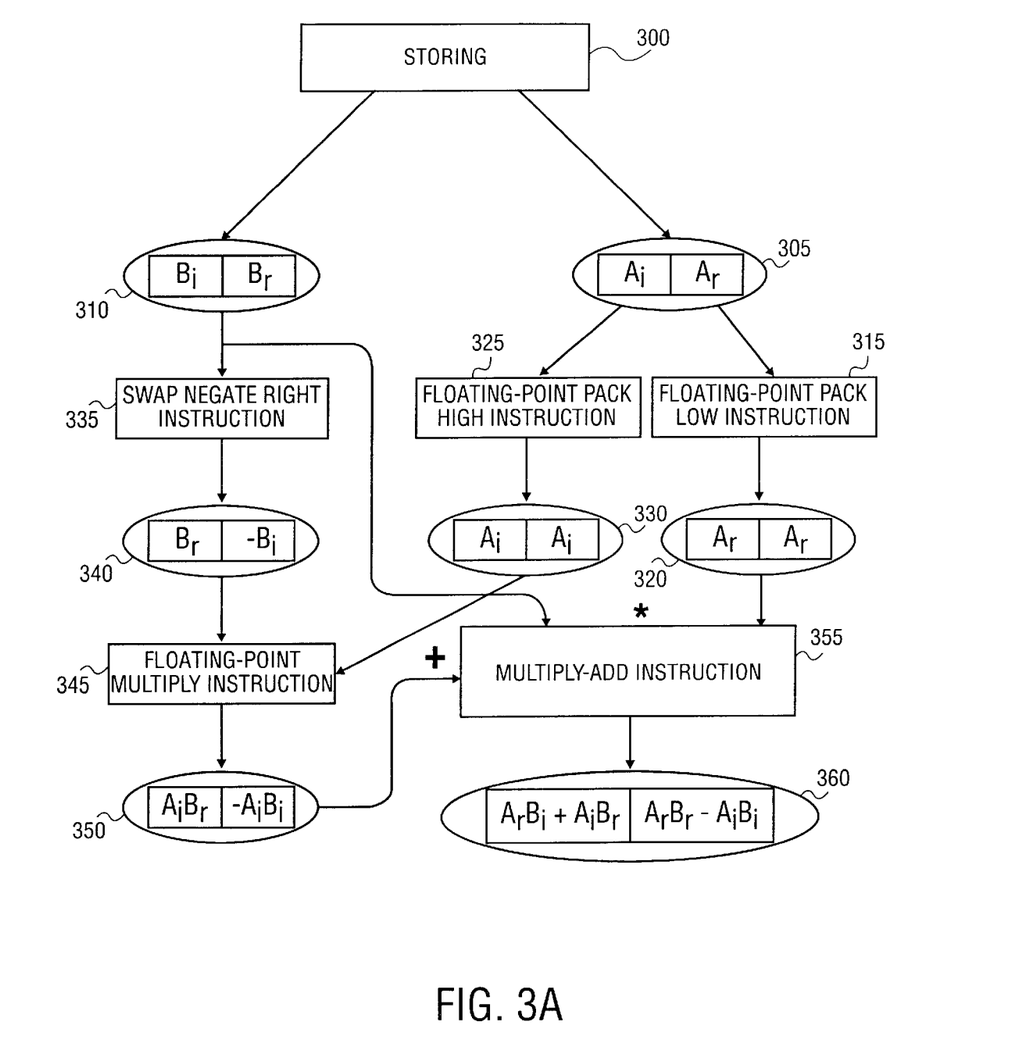
FIG. 3A illustrates a technique for performing a complex multiply operation using little endian byte ordering according to one embodiment of the present invention.

FIG. 3A illustrates a technique for performing a complex multiply operation using little endian byte ordering according to one embodiment of the present invention. In this illustration, data is represented by ovals, while instructions are represented by rectangles.

At block 300, a complex number A and a complex number B are stored in a first packed data item 305 and a second packed data item 310, respectively. The first packed data item 305 stores data elements representing the complex number A in a first format (such that the data elements are Ai, Ar), while the second packed data item 310 stores data elements representing the complex number B in a second format (such that the data elements are Bi, Br). Of course, one or both of these numbers could be real numbers. In such situations, the real number(s) would be stored in these complex formats by storing zero as the imaginary components.

At block 315, a floating-point pack low instruction is performed on the first data element (Ar) of the first packed data item 305 to generate a first intermediate packed data item 320. Similarly, at block 325 a floating-point pack high instruction is performed on the second data element (Ai) of the first packed data item 305 to generate a second intermediate packed data item 330. As a result, the first intermediate packed data item 320 contains first and second data elements each storing Ar (the real component of the complex number A) whereas the second intermediate packed data item 330 contains first and second data elements each storing Ai (the imaginary component of the complex number A).

FIG. 3A also shows the advantage of using the FSWAP-NR instruction 335. In particular, the FSWAP-NR instruction is performed on the second packed data item 310 to generate a resulting packed data item 340. The FSWAP-NR instruction places the first data element (Br) of the second packed data item 310, which occupies the lower data element, in the second data element of the resulting packed data item 340 (i.e., the higher data element). Additionally, the FSWAP-NR instruction places the second data element (Bi) of the second packed data item 310, which occupies the higher data element, in the first data element of the resulting packed data item 340 (the higher data element), and negates the first data element. Thus, the resulting packed data item 340 contains first and second data elements storing Br and −Bi.

At block 340, a floating-point multiply instruction is performed on the resulting packed data item 340 and the second intermediate packed data item 330 to generate a second resulting packed data item 350. In particular, the floating-point multiply instruction multiplies the first data element of the resulting packed data item 340 (−Bi) with the first data element of the second intermediate packed data item 330 (Ai), and multiplies the second data element of the resulting packed data item 340 (Br) with the second data element of the second intermediate packed data item 330 (Ai). The second resulting packed data item 350 contains a first data element storing −AiBi and a second data element storing AiBr.

At block 355, a multiply-add instruction is performed on the first intermediate packed data item 320 and the second packed data item 310, and the second resulting packed data item 350. In particular, the multiply-add instruction multiplies the first data elements of the first intermediate packed data item 320 (Ar) with the second packed data item 310 (Br), adds the multiplied data elements to the first data element of the second resulting packed data item 350 (−AiBi), and places the result in a first data element of the final resulting packed data item 360. The multiply-add instruction also multiplies the second data elements of the first intermediary packed data item 320 (Ar) with the second packed data item 310 (Bi), adds the multiplied data elements to the second data element of the second resulting packed data item 350 (AiBr), and places the result in a second data element of the final resulting packed data item 360. Thus, the final resulting packed data item 360 contains the first data element storing ArBr−AiBi (the real component of multiplying together complex numbers A and B), and the second data element storing ArBi+AiBr (the imaginary component of multiplying together complex numbers A and B).

Thus, by using the FSWAP-NR instruction together with arranging data representing complex numbers in the appropriate formats, the multiplication of two complex numbers may be performed in five instructions, namely instructions at blocks 315, 325, 335, 345, and 355. This provides a significant performance advantage over prior art techniques of performing complex multiplication. Of course, the advantages of this invention are greater when many such complex multiplication operations are required.

The block 300 of storing represents a variety of ways of storing the first and second packed data items in the appropriate formats. For example, the complex data may already be stored on a CD-ROM (represented by the storage device 110) in the described formats. In which case, block 300 may be performed by copying the complex data from the CD-ROM into the main memory (also represented by the storage device 110), and then into registers 155 on the processor 105. As another example, the fax/modem 134 (see FIG. 1) connecting the computer system 100 to network 130 may receive complex data and store it in the main memory in one or more of the formats described herein—storing two representations of each of the components of the complex data such that it may be read in as packed data item in the described formats. This complex data may then be accessed as packed data and copied into registers on the processor 105. Since the data is stored in the disclosed formats, the processor 105 can easily and efficiently perform the complex multiplication (e.g., the processor 105 can access the first packed data item 310 in a single instruction). Although these formats for storing complex numbers require more storage space, the performance advantage for complex multiplication is worth the additional storage space in some situations.

Figure 3B:
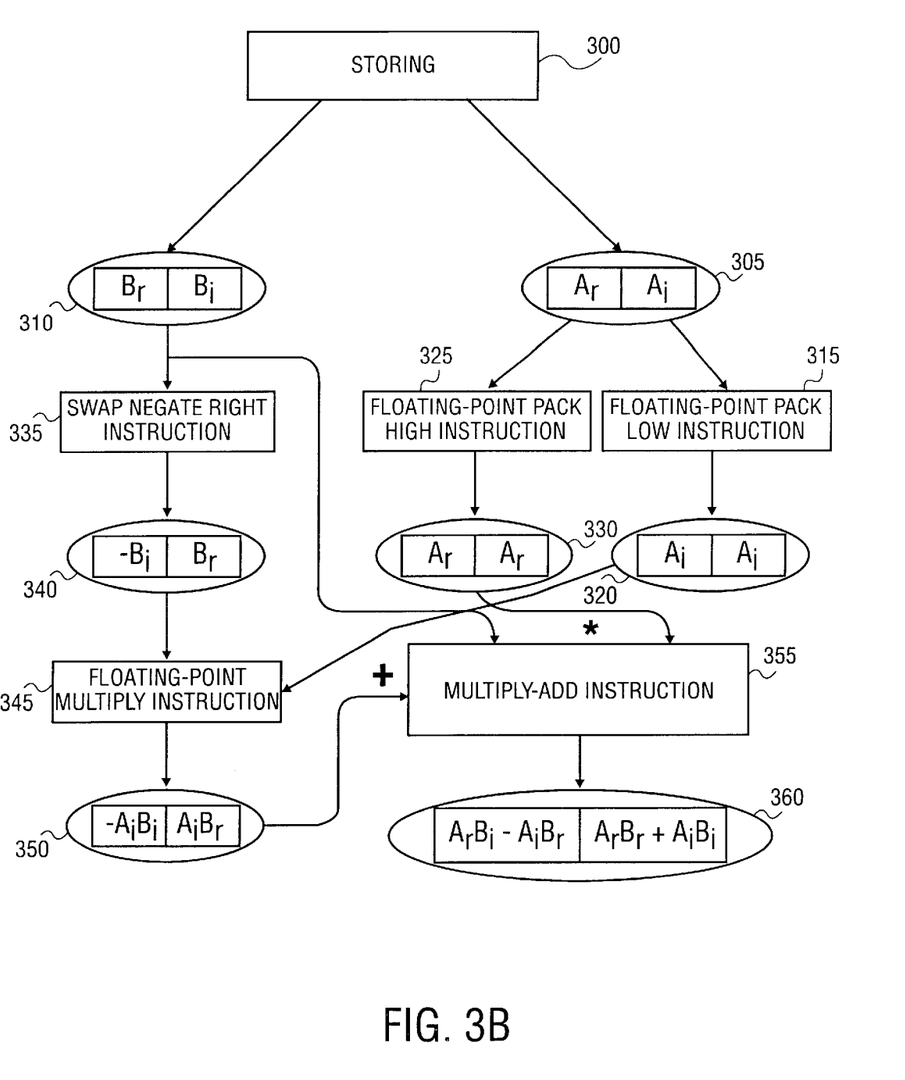
FIG. 3B illustrates a technique for performing a complex multiply operation using big endian byte ordering according to one embodiment of the present invention.

The technique for performing a complex multiply operation as shown in FIG. 3A utilizes the little endian protocol. The same technique can also be used in a system using the big endian protocol, as shown in FIG. 3B. Note that at block 335 of FIG. 3B, the SWAP-NL instruction is used.

Figure 4:
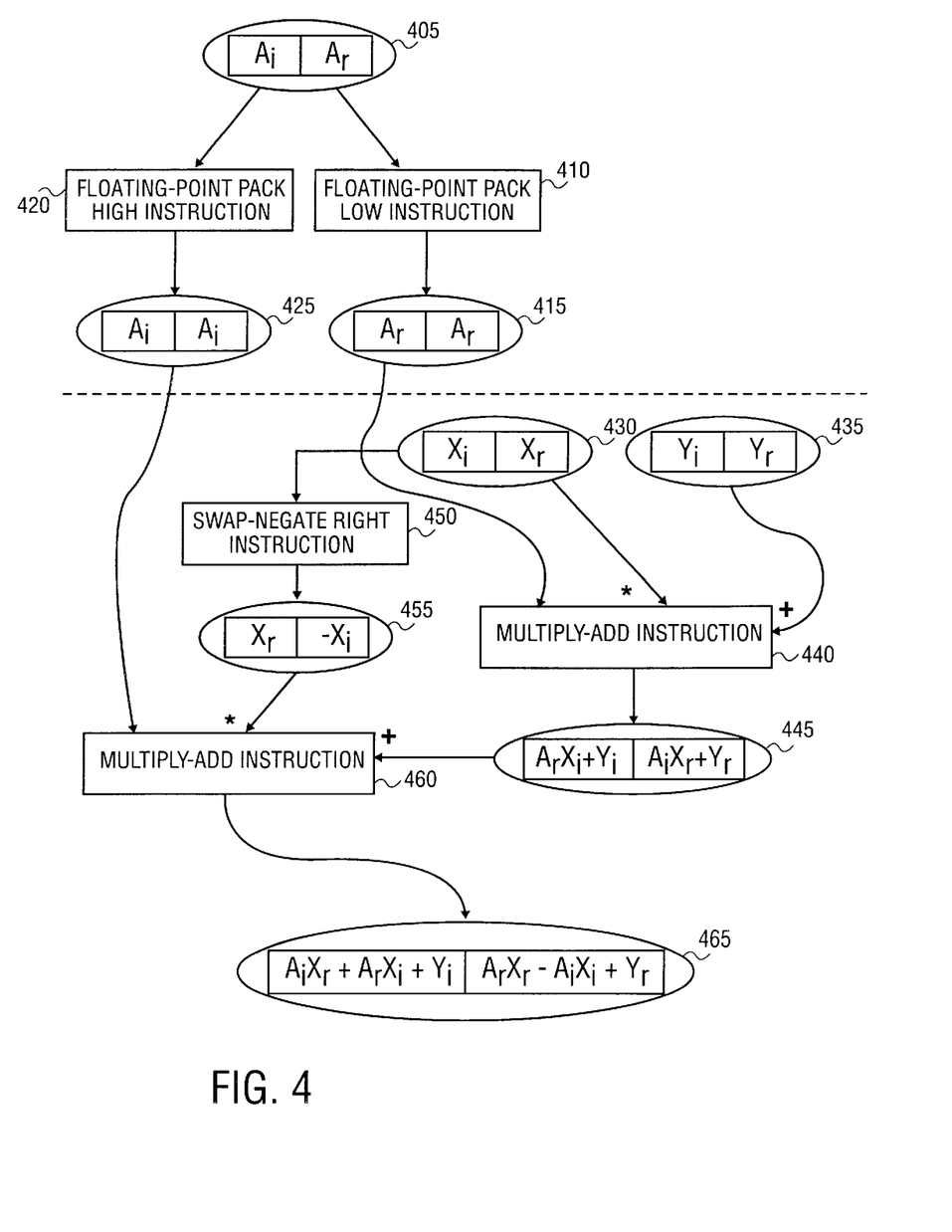
FIG. 4 illustrates a technique for performing a complex multiply operation where one of the operands is reused according to one embodiment of the present invention.

FIG. 4 illustrates a technique for performing a complex multiply operation where one of the operands is reused according to one embodiment of the present invention. In this illustration, a complex scalar A is multiplied by a complex vector X[i] and added to a complex vector Y[i], given by the following expression:

$$Y[i]=Y[i]+A*X[i]. \tag{1}$$

This formula is used in many applications including, for example, but not limited or restricted to, signal processing applications (e.g., sonar, radar, seismology, speech communications, data communication, acoustics, etc.), image processing applications, and various other applications.

Referring to FIG. 4, a first packed data item 405 stores data elements representing a complex scalar number A. The first packed data item 405 has two data elements each containing, for example, 32-bits, although other numbers of bits may be used. The data elements of the first packed data item 405 are Ar and Ai.

At block 410, a floating-point pack low instruction is performed on the first data element (Ar) of the first packed data item 405 to generate a first intermediate packed data item 415. Similarly, at block 420 a floating-point pack high instruction is performed on the second data element (Ai) of the first packed data item 405 to generate a second intermediate packed data item 425. As a result, the first intermediate packed data item 415 contains first and second data elements each storing Ar (the real component of the complex number A) whereas the second intermediate packed data item 425 contains first and second data elements each storing Ai (the imaginary component of the complex number A). The packed data items 415 and 425 are reused for performing multiple complex multiplications.

Also shown is a second packed data item 430 representing a first complex vector X[i] and a third packed data item 435 representing a second complex vector Y[i]. The data elements for the second packed data item 430 are Xi and Xr, respectively, and the data elements for the third packed data item 435 are Yi and Yr, respectively. At block 440, a multiply-add instruction is performed on the first intermediate packed data item 415, the second packed data item 430, and the third packed data item 435. That is, the multiply-add instruction multiplies the first data elements of the first intermediate packed data item 415 (Ar) with the second packed data item 430 (Xr), adds the multiplied value to the first data element of the third packed data item 430 (Yr), and places the result in a first data element of a first resulting packed data item 445. The multiply-add instruction also multiplies the second data elements of the first intermediary packed data item 415 (Ar) with the second packed data item 430 (Xi), adds the multiplied value to the second data element of the third packed data item 435 (Yi), and places the result in a second data element of the first resulting packed data item 445. Thus, the first resulting packed data item 445 contains the first data element storing ArXr+Yr, and the second data element storing ArXi+Yi.

At block 450, a FSWAP-NR instruction 450 is performed on the second packed data item 430 to generate a second resulting packed data item 455. Note that the FSWAP-NR instruction may be performed before, in parallel, or after the multiply-add instruction 440. In particular, the FSWAP-NR instruction places the first data element (Xr) of the second packed data item 430, which occupies the lower data element, in the second data element of the second resulting packed data item 455 (i.e., the higher data element). Additionally, the FSWAP-NR instruction places the second data element (Xi) of the second packed data item 430, which occupies the higher data element, in the first data element of the second resulting packed data item 455 (the higher data element), and negates the first data element. Thus, the second resulting packed data item 455 contains first and second data elements storing Xr and −Xi.

At block 460, a second multiply-add instruction is performed on the second intermediate packed data item 425, the second resulting packed data item 455, and the first resulting packed data item 445. The multiply-add instruction multiplies the first data elements of the second intermediate packed data item 425 (Ai) with the second resulting packed data item 455 (−Xi), adds the multiplied value to the first data element of the first resulting packed data item 445 (ArXr+Yr), and places the result in a first data element of a final resulting packed data item 465. The multiply-add instruction also multiplies the second data elements of the second intermediary packed data item 425 (Ai) with the second resulting packed data item 455 (Xr), adds the multiplied value to the second data element of the first resulting packed data item 445 (ArXi+Yi), and places the result in a second data element of the final resulting packed data item 465. Thus, the final resulting packed data item 465 contains the first data element storing ArXr−AiXi+Yr (the real component of equation (1)), and the second data element storing AiXr+ArXi+Yi (the complex component of the equation (1)).

It must be noted that the final resulting packed data item 465 may be stored in the third packed data item 435 to reflect the updated Y[i] in the left-hand side of equation (1). This updated complex vector Y[i] is then used with the complex scalar A and the new X[i] to calculate a new Y[i], and so on. As can be seen from equation (1) and FIG. 4, it takes five instructions (blocks 410, 420, 440, 450, and 460) to calculate the vector Y[i] the first time. Thereafter, it only takes three instructions (blocks 440, 450, and 460) to calculate a next Y[i] because the data items 415 and 425 (the real and imaginary components of the scalar A) are reused after they are loaded the first time. As such, a further performance advantage is realized in looping operations.

In the embodiments illustrating the present invention, the processor 105, executing the SWAP, SWAP-NL, and SWAP-NR instructions, operated on packed data in "packed double word" format, i.e., two data elements per operand or register. However, it is to be appreciated that the processor 105 can operate on packed data in other different packed data formats. The processor can operate on packed data having more than two data elements per register and/or memory location. In one illustration, the processor can operate on packed data having four data elements in a 128-bit register. Other packed formats and/or register sizes are possible and within the scope of the present invention.

One application of the present invention involves speech communication and/or recognition. In such an application, an audio signal is recorded by the microphone of the sound unit 138 (or is received by the fax/modem 134) and converted into a digital audio stream by the analog-to-digital converter of the sound unit 138 for storage in the storage device 110. A filtering operation is then performed on the digital audio stream (which represents the audio signal) to smooth out the audio signal or for recognizing the speech. The filtering operation may be performed using a fast Fourier transform (e.g., a radix-2 butterfly). The SWAP-NL and SWAP-NR instructions are used, as illustrated in FIGS. 3A, 3B, and 4, to perform complex multiplications during the filtering operation. The filtered digital audio stream is then transmitted to the sound unit 138 which converts the filtered audio stream into a filtered analog signal and outputs the audio signal to the speaker of the sound unit 138. In the case of speech recognition, the filtered audio stream is then compared with a glossary of predetermined terms stored in the storage device 110 to determine whether the audio signal is a recognized command.

In another embodiment involving video communications, a video signal is received by the digitizing unit 136 which converts the video signal into a digital video stream (represented by complex numbers) for storage. A filtering operation may also be performed on the digital video stream which involves the multiplication of complex number. The multiplication techniques of the present invention is used to enhance the efficiency of the filtering operation. Once the digital video stream is filtered, it is sent out to the display 125 for viewing. Based on the foregoing, the floating-point swap instructions may be used in a myriad of applications utilizing complex arithmetic for increasing efficiency of such applications.

While certain exemplary embodiments have been described and shown in the accompanying drawings, it is to be understood that such embodiments are merely illustrative of and not restrictive on the broad invention. Moreover, it is to be understood that this invention not be limited to the specific constructions and arrangements shown and described, since various other modifications may occur to those ordinarily skilled in the art.

What is claimed is:

1. A method comprising the computer implemented acts of:

decoding a single instruction;

in response to decoding said single instruction, moving a first operand occupying lower order bits of a first storage area to higher order bits of a result;

moving a second operand occupying higher order bits of a second storage area to lower order bits of the result; and negating one of the first and second operands of the result.

2. The method of claim 1 wherein said negating includes: negating the first operand of the result.

3. The method of claim 1 wherein said negating includes: negating the second operand of the result.

4. The method of claim 1 wherein the first and second storage areas are the same storage area.

5. The method of claim 1 further comprising:

storing the result in one of the first and second storage areas also in response to decoding said instruction.

6. The method of claim 1 wherein the first and second storage areas are registers.

7. The method of claim 1 wherein the first and second storage areas are memory locations.

8. A processor, comprising:

a decoder to decode instructions; and a circuit coupled to said decoder, said circuit in response to a single decoded instruction to, move a first operand occupying lower order bits of a first storage area to higher order bits of a result, move a second operand occupying higher order bits of a second storage area to lower order bits of the result, and negate one of the first and second operands of the result.

9. The processor of claim 8 wherein the first operand of the result is negated.

10. The processor of claim 8 wherein the second operand of the result is negated.

11. The processor of claim 8 wherein the first and second storage areas are the same storage area.

12. The processor of claim 8 wherein said circuit in response to a single decoded instruction to also store the result in one of the first and second storage areas.

13. The processor of claim 8 wherein the first and second storage areas are registers.

14. A method of multiplying a first floating-point complex number with a second floating-point complex number where each floating-point complex number includes a real component and an imaginary component, the method comprising the computer implemented acts of:

packing the real component of the first complex number into first and second data elements of a first result;

packing the imaginary component of the first complex number into first and second data elements of a second result;

swapping the real and imaginary components of the second complex number to form a third result;

negating the imaginary component of the third result;

multiplying the first data element of the second result with the negated imaginary component of the third result to form a first data element of a fourth result, and the second data element of the second result with the real component of the third result to form a second data element of the fourth result; and multiplying the first data element of the first result with the real component of the second complex number and adding it to the first data element of the fourth result to form a first data element of a final result, and the second data element of the first result with the imaginary component of the second complex number and adding it to the second data element of the fourth result to form a second data element of the final result.

15. A processor, comprising:

a decoder to decode instructions; and a circuit coupled to said decoder, said circuit in response to one or more decoded instructions to, pack a real component of a first complex number into first and second data elements of a first result, pack an imaginary component of the first complex number into first and second data elements of a second result, swap the real and imaginary components of the second complex number to form a third result;

negate the imaginary component of the third result;

multiply the first data element of the second result with the negated imaginary component of the third result to form a first data element of a fourth result, and the second data element of the second result with the real component of the third result to form a second data element of the fourth result; and multiply the first data element of the first result with the real component of the second complex number and adding it to the first data element of the fourth result to form a first data element of a final result, and the second data element of the first result with the imaginary component of the second complex number and adding it to the second data element of the fourth result to form a second data element of the final result.

16. The processor of claim 15 wherein the first through fourth result and the final result are stored in registers.

17. A computer system, comprising:

a machine readable medium storing one or more instructions; and a processor coupled to said machine readable medium, said processor in response to said one or more decoded instructions to, pack a real component of a first complex number into first and second data elements of a first result, pack an imaginary component of the first complex number into first and second data elements of a second result, swap the real and imaginary components of the second complex number to form a third result;

negate the imaginary component of the third result;

multiply the first data element of the second result with the negated imaginary component of the third result to form a first data element of a fourth result, and the second data element of the second result with the real component of the third result to form a second data element of the fourth result; and multiply the first data element of the first result with the real component of the second complex number and adding it to the first data element of the fourth result to form a first data element of a final result, and the second data element of the first result with the imaginary component of the second complex number and adding it to the second data element of the fourth result to form a second data element of the final result.

18. The computer system of claim 17 wherein the machine-readable medium comprises a volatile memory.

19. The computer system of claim 17 wherein the machine-readable medium comprises a disk.

20. The computer system of claim 17 further comprising an analog-to-digital converter coupled to the processor by way of a bus to provide the first and second complex numbers.

* * * * *